(12) United States Patent
Grether-Schene et al.

(10) Patent No.: US 8,932,727 B2
(45) Date of Patent: Jan. 13, 2015

(54) AQUEOUS COMPOSITIONS FOR WHITENING AND SHADING IN COATING APPLICATIONS

(75) Inventors: Heidrun Grether-Schene, Efringen-Kirchen (DE); Cédric Klein, Habsheim (FR); David Puddiphatt, Bradford (GB)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 13/703,290

(22) PCT Filed: Jun. 21, 2011

(86) PCT No.: PCT/EP2011/003047
§ 371 (c)(1),
(2), (4) Date: Mar. 1, 2013

(87) PCT Pub. No.: WO2012/000624
PCT Pub. Date: Jan. 5, 2012

(65) Prior Publication Data
US 2013/0209820 A1   Aug. 15, 2013

(30) Foreign Application Priority Data
Jul. 1, 2010   (EP) .................................... 10006814

(51) Int. Cl.
    *B32B 23/04*        (2006.01)
(52) U.S. Cl.
    USPC ........ 428/537.5; 428/532; 428/536; 428/323; 428/402; 162/158; 162/162.1; 162/85; 106/287.21; 524/100; 8/636; 8/648; 8/657
(58) Field of Classification Search
    USPC ..................... 162/158, 162, 185; 106/287.21; 524/100; 8/636, 648, 657; 428/323, 428/402, 532, 536, 537.5
    See application file for complete search history.

(56) References Cited

U.S. PATENT DOCUMENTS 3,684,728 A * 8/1972 Kissling et al. .......... 252/301.23
2003/0188393 A1 * 10/2003 Tindal .............................. 8/532

(Continued)

FOREIGN PATENT DOCUMENTS

DE      199 16 078 A1   10/2000
EP      0 534 903 A1    3/1993

(Continued)

OTHER PUBLICATIONS

International Search Report dated Aug. 12, 2011, issued in PCT/EP2011/003047.

International Search Report dated Sep. 26, 2011, issued in PCT/EP2011/003692.

(Continued)

*Primary Examiner* — Leszek Kiliman
(74) *Attorney, Agent, or Firm* — Miles & Stockbridge P.C.

(57) ABSTRACT

Aqueous coating composition for optical brightening and shading of substrates comprising (a) at least one optical brightener of formula (I)
in which
the anionic charge on the brightener is balanced by a cationic charge composed of one or more identical or different cations selected from the group consisting of hydrogen, an alkali metal cation, alkaline earth metal, ammonium, ammonium which is mono-, di-, tri- or tetrasubstituted by a $C_1$-$C_4$ linear or branched alkyl radical, ammonium which is mono-, di-, tri- or tetrasubstituted by a $C_1$-$C_4$ linear or branched hydroxyalkyl radical, ammonium which is, di-, tri- or tetrasubstituted by a mixture of $C_1$-$C_4$ linear or branched alkylradical and linear or branched hydroxyalkyl radical or mixtures of said compounds, $R_1$ and $R_1'$ may be the same or different, and each is hydrogen, $C_1$-$C_4$ linear or branched alkyl, $C_2$-$C_4$ linear or branched hydroxyalkyl, $CH_2CO_2^-$, $CH_2CH_2CONH_2$ or $CH_2CH_2CN$, $R_2$ and $R_2'$ may be the same or different, and each is $C_1$-$C_4$ linear or branched alkyl, $C_2$-$C_4$ linear or branched hydroxyalkyl, $CH_2CO_2^-$, $CH(CO_2^-)CH_2CO_2^-$, $CH(CO_2^-)CH_2CH_2CO_2^-$, $CH_2CH_2SO_3^-$, $CH_2CH_2CO_2^-$, $CH_2CH(CH_3)CO_2^-$, benzyl, or $R_1$ and $R_2$ and/or $R_1'$ and $R_2'$, together with the neighboring nitrogen atom signify a morpholine ring and p is 0, 1 or 2, (b) at least one shading dye of formula (II)
in which
$R_3$ signifies H, methyl or ethyl,
$R_4$ signifies paramethoxyphenyl, methyl or ethyl,
M signifies a cation selected from the group consisting of hydrogen, an alkali metal cation, alkaline earth metal, ammonium, ammonium which is mono-, di-, tri- or tetrasubstituted by a $C_1$-$C_4$ linear or branched alkyl radical, ammonium which is mono-, di-, tri- or tetrasubstituted by a $C_1$-$C_4$ linear or branched hydroxyalkyl radical, ammonium which is, di-, tri- or tetrasubstituted by a mixture of $C_1$-$C_4$ linear or branched alkylradical and linear or branched hydroxyalkyl radical or mixtures of said compounds, (c) at least one white pigment,
(d) at least one primary binder,
(e) optionally one or more secondary binders and
(f) water.

19 Claims, No Drawings

(56) References Cited

U.S. PATENT DOCUMENTS

| | | |
|---|---|---|
| 2003/0236326 A1 | 12/2003 | Drenker et al. |
| 2006/0079438 A1* | 4/2006 | Brush et al. ................ 510/516 |
| 2012/0118522 A1* | 5/2012 | Grether-Schene ........... 162/162 |
| 2012/0311798 A1* | 12/2012 | Klein et al. ..................... 8/636 |
| 2013/0209820 A1* | 8/2013 | Grether-Schene et al. ................... 428/537.5 |

FOREIGN PATENT DOCUMENTS

| | | |
|---|---|---|
| EP | 1 355 004 A1 | 10/2003 |
| WO | 02/18705 A1 | 3/2002 |
| WO | 2009118247 A1 | 10/2009 |
| WO | WO 2011/009632 A1 * | 1/2011 |
| WO | WO 2011/098237 A1 * | 8/2011 |
| WO | WO 2012/000624 A1 * | 1/2012 |

OTHER PUBLICATIONS

International Search Report dated Aug. 12, 2011, issued in PCT/EP2011/003048.

* cited by examiner

AQUEOUS COMPOSITIONS FOR WHITENING AND SHADING IN COATING APPLICATIONS

The instant invention relates to aqueous coating compositions comprising derivatives of diaminostilbene optical brightener, shading dyes, white pigments, primary binders, and optionally secondary binders which can be used to provide coated substrates of high whiteness and brightness.

BACKGROUND OF THE INVENTION

It is well known that the whiteness and thereby the attractiveness of coated papers can be improved by the addition of optical brighteners and shading dyes to the coating composition.

WO 0218705 A1 however teaches that the use of shading dyes, while having a positive effect on whiteness, has a negative impact on brightness. The solution to this problem is to add additional optical brightener, the advantage claimed in WO 0218705 A1 being characterized by the use of a mixture comprising at least one direct dye (exemplified by C.I. Direct Violet 35) or pigment (exemplified by C.I. Pigment Violet 23) and at least one optical brightener.

In order to satisfy the demand for coated papers of higher whiteness and brightness, there is a need for more efficient shading compositions.

Surprisingly, we have now discovered certain shading dyes which have a strongly positive effect on whiteness while having little or no effect on brightness, and which can be used in coating compositions comprising optical brighteners, white pigments, primary binders, and optionally secondary binders in order to enable the papermaker to reach high levels of whiteness and brightness.

Therefore, the goal of the present invention is to provide aqueous coated compositions containing derivatives of diaminostilbene optical brightener, certain shading dyes, white pigments, primary binders, and optionally secondary binders, which can afford enhanced high whiteness levels while avoiding the disadvantages characterized by the use of shading dyes (loss of brightness) or pigments (lower whiteness build) recognized as being state-of-the-art.

DESCRIPTION OF THE INVENTION

The present invention therefore provides aqueous coating compositions for optical brightening and shading of substrates, preferably paper, comprising
(a) at least one optical brightener of formula (I)

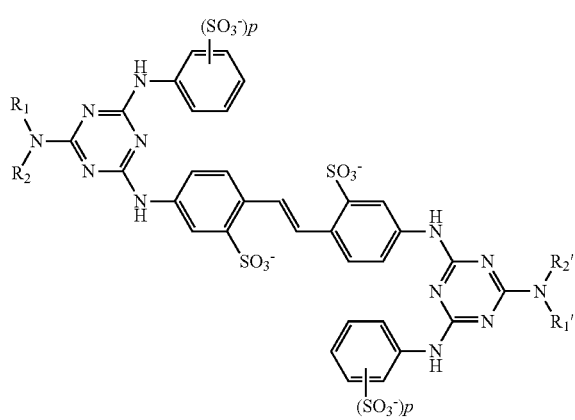

in which
the anionic charge on the brightener is balanced by a cationic charge composed of one or more identical or different cations selected from the group consisting of hydrogen, an alkali metal cation, alkaline earth metal, ammonium, ammonium which is mono-, di-, tri- or tetrasubstituted by a $C_1$-$C_4$ linear or branched alkyl radical, ammonium which is mono-, di-, tri- or tetrasubstituted by a $C_1$-$C_4$ linear or branched hydroxyalkyl radical, ammonium which is, di-, tri- or tetrasubstituted by a mixture of $C_1$-$C_4$ linear or branched alkylradical and linear or branched hydroxyalkyl radical or mixtures of said compounds, $R_1$ and $R_1'$ may be the same or different, and each is hydrogen, $C_1$-$C_4$ linear or branched alkyl, $C_2$-$C_4$ linear or branched hydroxyalkyl, $CH_2CO_2^-$, $CH_2CH_2CONH_2$ or $CH_2CH_2CN$, $R_2$ and $R_2'$ may be the same or different, and each is $C_1$-$C_4$ linear or branched alkyl, $C_2$-$C_4$ linear or branched hydroxyalkyl, $CH_2CO_2^-$, $CH(CO_2^-)CH_2CO_2^-$, $CH(CO_2^-)CH_2CH_2CO_2^-$, $CH_2CH_2SO_3^-$, $CH_2CH_2CO_2^-$, $CH_2CH(CH_3)CO_2^-$, benzyl, or $R_1$ and $R_2$ and/or $R_1'$ and $R_2'$, together with the neighboring nitrogen atom signify a morpholine ring and
p is 0, 1 or 2,
(b) at least one shading dye of formula (II)

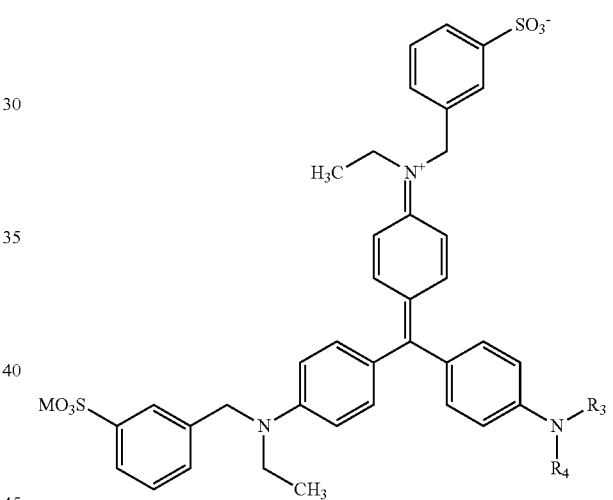

in which
$R_3$ signifies H, methyl or ethyl,
$R_4$ signifies paramethoxyphenyl, methyl or ethyl,
M signifies a cation selected from the group consisting of hydrogen, an alkali metal cation, alkaline earth metal, ammonium, ammonium which is mono-, di-, tri- or tetrasubstituted by a $C_1$-$C_4$ linear or branched alkyl radical, ammonium which is mono-, di-, tri- or tetrasubstituted by a $C_1$-$C_4$ linear or branched hydroxyalkyl radical, ammonium which is, di-, tri- or tetrasubstituted by a mixture of $C_1$-$C_4$ linear or branched alkylradical and linear or branched hydroxyalkyl radical or mixtures of said compounds,
(c) at least one white pigment,
(d) at least one primary binder,
(e) optionally one or more secondary binders and
(f) water.

In compounds of formula (I) for which p is 1, the $SO_3^-$ group is preferably in the 4-position of the phenyl group.

In compounds of formula (I) for which p is 2, the $SO_3^-$ groups are preferably in the 2,5-positions of the phenyl group.

Preferred compounds of formula (I) are those in which the anionic charge on the brightener is balanced by a cationic charge composed of one or more identical or different cations selected from the group consisting of hydrogen, an alkali metal cation, alkaline earth metal, ammonium which is mono-, di-, tri- or tetrasubstituted by a $C_1$-$C_4$ linear or branched hydroxyalkyl radical, ammonium which is, di-, tri- or tetrasubstituted by a mixture of $C_1$-$C_4$ linear or branched alkylradical and linear or branched hydroxyalkyl radical or mixtures of said compounds, $R_1$ and $R_1'$ may be the same or different, and each is hydrogen, $C_1$-$C_4$ linear or branched alkyl, $C_2$-$C_4$ linear or branched hydroxyalkyl, $CH_2CO_2^-$, $CH_2CH_2CONH_2$ or $CH_2CH_2CN$, $R_2$ and $R_2'$ may be the same or different, and each is $C_1$-$C_4$ linear or branched alkyl, $C_2$-$C_4$ linear or branched hydroxyalkyl, $CH_2CO_2^-$, $CH(CO_2^-)CH_2CO_2^-$ or $CH_2CH_2SO_3^-$ and p is 0, 1 or 2.

More preferred compounds of formula (I) are those in which
the anionic charge on the brightener is balanced by a cationic charge composed of one or more identical or different cations selected from the group consisting of $Li^+$, $Na^+$, $K^+$, $Ca^{2+}$, $Mg^{2+}$, ammonium which is mono-, di-, tri- or tetrasubstituted by a $C_1$-$C_4$ linear or branched hydroxyalkyl radical, ammonium which is, di-, tri- or tetrasubstituted by a mixture of $C_1$-$C_4$ linear or branched alkylradical and linear or branched hydroxyalkyl radical or mixtures of said compounds, $R_1$ and $R_1'$ may be the same or different, and each is hydrogen, methyl, ethyl, propyl, α-methylpropyl, β-methylpropyl, β-hydroxyethyl, β-hydroxypropyl, $CH_2CO_2^-$, $CH_2CH_2CONH_2$ or $CH_2CH_2CN$, $R_2$ and $R_2'$ may be the same or different, and each is methyl, ethyl, propyl, α-methylpropyl, β-methylpropyl, β-hydroxyethyl, β-hydroxypropyl, $CH_2CO_2^-$, $CH(CO_2^-)CH_2CO_2^-$ or $CH_2CH_2SO_3^-$ and p is 0, 1 or 2.

Especially preferred compounds of formula (I) are those in which
the anionic charge on the brightener is balanced by a cationic charge composed of one or more identical or different cations selected from the group consisting of $Na^+$, $K^+$, triethanolammonium, N-hydroxyethyl-N,N-dimethylammonium, N-hydroxyethyl-N,N-diethylammonium or mixtures of said compounds, $R_1$ and $R_1'$ may be the same or different, and each is hydrogen, ethyl, propyl, β-hydroxyethyl, β-hydroxypropyl, $CH_2CO_2^-$, or $CH_2CH_2CN$, $R_2$ and $R_2'$ may be the same or different, and each is ethyl, propyl, β-hydroxyethyl, β-hydroxypropyl, $CH_2CO_2^-$, $CH(CO_2^-)CH_2CO_2^-$ or $CH_2CH_2SO_3^-$ and p is 1 or 2.

Compound of formula (I) is used in an amount typically of from 0.01 to 5% by weight, preferably in the range of from 0.05 to 3% by weight, the % by weight being based on the total weight of dry white pigment.

Preferred compounds of formula (II) are those in which
$R_3$ signifies H, methyl or ethyl,
$R_4$ signifies paramethoxyphenyl, methyl or ethyl,
M signifies a cation selected from the group consisting of hydrogen, an alkali metal cation, alkaline earth metal, ammonium which is mono-, di-, tri- or tetrasubstituted by a $C_1$-$C_4$ linear or branched hydroxyalkyl radical, ammonium which is, di-, tri- or tetrasubstituted by a mixture of $C_1$-$C_4$ linear or branched alkylradical and linear or branched hydroxyalkyl radical or mixtures of said compounds.

More preferred compounds of formula (II) are those in which
$R_3$ signifies methyl or ethyl,
$R_4$ signifies methyl or ethyl,
M signifies a cation selected from the group consisting of $Li^+$, $Na^+$, $K^+$, ½$Ca^{2+}$, ½$Mg^{2+}$, ammonium which is mono-, di-, tri- or tetrasubstituted by a $C_1$-$C_4$ linear or branched hydroxyalkyl radical, ammonium which is, di-, tri- or tetrasubstituted by a mixture of $C_1$-$C_4$ linear or branched alkylradical and linear or branched hydroxyalkyl radical or mixtures of said compounds.

Especially preferred compounds of formula (II) are those in which
$R_3$ signifies methyl,
$R_4$ signifies methyl,
M signifies a cation selected from the group consisting of $Na^+$, $K^+$, triethanolammonium, N-hydroxyethyl-N,N-dimethylammonium, N-hydroxyethyl-N,N-diethylammonium or mixtures of said compounds.

Compound of formula (II) is used in an amount typically of from 0.00001 to 0.01% by weight, preferably in the range of form 0.00005 to 0.005% by weight, the % by weight being based on the total weight of dry white pigment.

Although it is possible to produce coating compositions that are free from white pigments, the best white substrates for printing are made using opaque coating compositions comprise from 10 to 70% by weight of white pigments, preferably of from 40 to 60% by weight of white pigments, the % by weight being based on the total weight of the coating composition. Such white pigments are generally inorganic pigments, e.g., aluminium silicates (kaolin, otherwise known as china clay), calcium carbonate (chalk), titanium dioxide, aluminium hydroxide, barium carbonate, barium sulphate, or calcium sulphate (gypsum). Preferably a mixture of from 10 to 20% by weight of clay and of from 30 to 40% by weight of chalk is used as white pigments, the % by weight being based on the total weight of the coating composition.

The binders may be any of those commonly used in the paper industry for the production of coating compositions and may consist of a single binder or of a mixture of primary and secondary binders.

The sole or primary binder is preferably a synthetic latex, typically a styrene-butadiene, vinyl acetate, styrene acrylic, vinyl acrylic or ethylene vinyl acetate polymer. The preferred primary binder is a latex binder.

The sole or primary binder is used in an amount typically in the range of form 2 to 25% by weight, preferably of from 4 to 20% by weight, the % by weight being based on the total weight of white pigment.

The secondary binder which may be optionally used may be, e.g., starch, carboxymethylcellulose, casein, soy polymers, polyvinyl alcohol or a mixture of any of the above. The preferred secondary binder which may be optionally used is a polyvinyl alcohol binder.

The polyvinyl alcohol which may be optionally used in the coating composition as secondary binder has preferably a degree of hydrolysis greater than or equal to 60% and a Brookfield viscosity of from 2 to 80 mPa·s (4% aqueous solution at 20° C.). More preferably, the polyvinyl alcohol has a degree of hydrolysis greater than or equal to 80% and a Brookfield viscosity of from 2 to 40 mPa·s (4% aqueous solution at 20° C.).

When optionally used, the secondary binder is used in an amount typically in the range of form 0.1 to 20% by weight, preferably of from 0.2 to 8% by weight, more preferably of from 0.3 to 6% by weight, the % by weight being based on the total weight of white pigment.

The pH value of the coating composition is typically in the range of from 5 to 13, preferably of from 6 to 11, more preferably of from 7 to 10. Where it is necessary to adjust the pH of the coating composition, acids or bases may be employed. Examples of acids which may be employed include but are not restricted to hydrochloric acid, sulphuric acid, formic acid and acetic acid. Examples of bases which may be employed include but are not restricted to alkali metal and alkaline earth metal hydroxide or carbonates, ammonia or amines.

In addition to one or more compounds of formula (I), one or more compounds of formula (II), one or more white pigments, one or more binders, optionally one or more secondary binders and water, the coating composition may contain by-products formed during the preparation of compounds of formula (I) and compounds of formula (II) as well as other conventional paper additives. Examples of such additives are for example antifreezers, dispersing agents, synthetic or natural thickeners, carriers, defoamers, wax emulsions, dyes, inorganic salts, solubilizing aids, preservatives, complexing agents, biocides, cross-linkers, pigments, special resins etc.

The coating composition may be prepared by adding one or more compounds of formula (I) and one or more compounds of formula (II), to a preformed aqueous dispersion of one or more binders, optionally one or more secondary binders and one or more white pigments.

One or more compounds of formula (I) and one or more compounds of formula (II) can be added in any order or at the same time to the preformed aqueous dispersion of one or more binders, optionally one or more secondary binders and one or more white pigments.

One or more compounds of formula (I), one or more compounds of formula (II) and optionally one or more secondary binders can be added as solids or as preformed aqueous solutions to the preformed aqueous dispersion of one or more white pigments.

The present invention further provides a process for the optical brightening and tinting of paper substrates characterized in that an aqueous coating composition containing at least one optical brightener, at least one certain shading dye, at least one white pigment, at least one binder and optionally at least one secondary binder is used.

When used as a preformed aqueous solution, the concentration of compound of formula (I) in water is preferably of from 1 to 50% by weight, more preferably of from 2 to 40% by weight, even more preferably from 10 to 30% by weight, the % by weight being based on the total weight of the preformed aqueous solution containing the compound of formula (I).

When used as a preformed aqueous solution, the concentration of compound of formula (II) in water is preferably of from 0.001 to 30% by weight, more preferably of from 0.01 to 25% by weight, even more preferably from 0.02 to 20% by weight, the % by weight being based on the total weight of the preformed aqueous solution containing the compound of formula (II).

When used as a preformed aqueous solution, the concentration of secondary binders in water is preferably of from 1 to 50% by weight, more preferably of from 2 to 40% by weight, even more preferably from 5 to 30% by weight, the % by weight being based on the total weight of the preformed aqueous solution containing the secondary binders.

The following examples shall demonstrate the instant invention in more details. In the present application, if not indicated otherwise, "parts" means "parts by weight" and "%" means "% by weight".

EXAMPLES

Preparative Example 1

An aqueous shading solution (S1) containing compound of formula (1) is prepared by slowly adding 50 parts of compound of formula (1) to 450 parts of water at room temperature with efficient stirring. The obtained solution is stirred for 1 hour and filtered to remove any insoluble particles. The resulting shading solution (S1) has a pH in the range of from 6.0 to 7.0 and contains 10% by weight of compound of formula (1), the % by weight being based on the total weight of the final aqueous shading solution (S1).

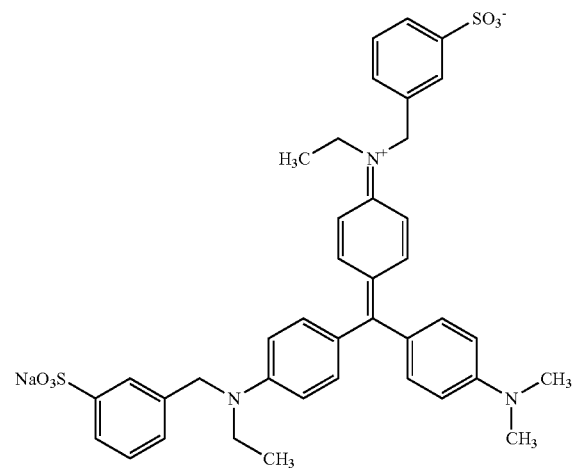

(1)

Application Example 1

A coating composition is prepared containing 70 parts chalk (commercially available under the trade name Hydrocarb 90 from OMYA), 30 parts clay (commercially available under the trade name Kaolin SPS from IMERYS), 42.8 parts water, 0.6 parts dispersing agent (a sodium salt of a polyacrylic acid commercially available under the trade name Polysalz S from BASF), 20 parts of 50% latex (a styrene butadiene copolymer commercially available under the trade name DL 921 from Dow), 0.8 parts of a polyvinyl alcohol having a degree of hydrolysis of 98-99% and Brookfield viscosity of 4.0-5.0 mPa·s (4% aqueous solution at 20° C.) and 0.5 parts of an aqueous solution of compound of formula (2) (approx. 18.0% by weight of compound of formula (2), the % by weight being based on the total weight of the aqueous solution containing compound of formula (2)). The solids content of the coating composition is adjusted to approx. 65% by the addition of water, and the pH is adjusted to 8-9 with sodium hydroxide.

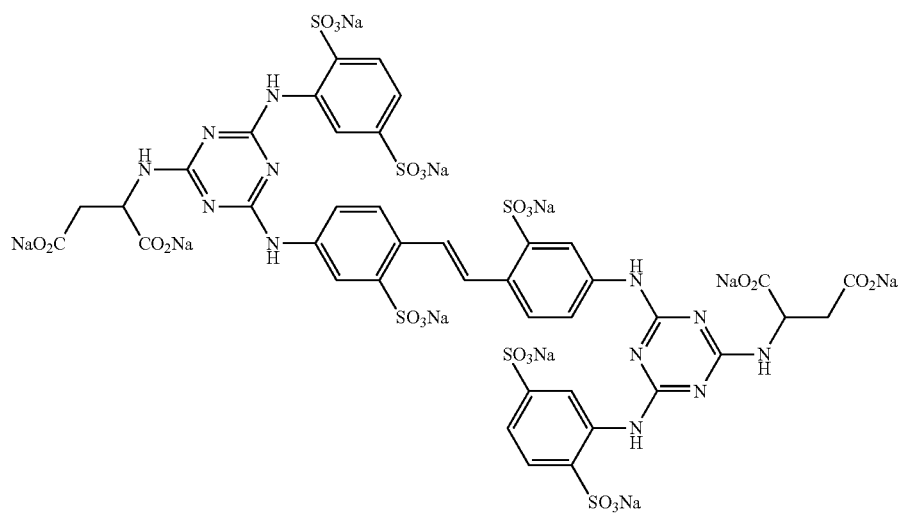

(2)

Aqueous shading solution (S1) prepared according to preparative example 1 is diluted 1 part to 1000 parts with water.

The so-formed diluted aqueous solution is added to the stirred coating composition at a range of concentrations of from 0 to 20% by weight (from 0 to 0.002% by weight of compound of formula (1) based on dry solid), the % by weight being based on the total weight of the dry pigment.

The brightened and shaded coating composition is then applied to a commercial 75 gsm neutral-sized white paper base sheet using an automatic wire-wound bar applicator with a standard speed setting and a standard load on the bar. The coated paper is then dried for 5 minutes in a hot air flow. Afterwards the paper is allowed to condition and measured then for CIE Whiteness and brightness on a calibrated Minolta spectrophotometer. The results are shown in Table 1 and Table 2 respectively and clearly show that the instant invention provides a high level of whiteness, while the loss of brightness at the highest addition level of shading dye is only 0.2%.

Comparative Application Example 1a

Comparative application example 1a was conducted as in application example 1 with the sole difference that a 10% by weight aqueous solution of C.I. Direct Violet 35 is used instead of the aqueous shading solution (S1), the % by weight being based on the total weight of the C.I. Direct Violet 35 aqueous solution.

CIE Whiteness and brightness are measured on a calibrated Minolta spectrophotometer. The results are shown in Table 1 and Table 2 respectively and clearly show that the use of a shading dye representing the state-of-the-art provides a lower whiteness level while accounting for a significant loss of brightness of up to 1.4%.

Comparative Application Example 1b

Comparative application example 1b was conducted as in application example 1 with the sole difference that a 10% by weight aqueous dispersion of C.I. Pigment Violet 23 is used instead of the aqueous shading solution (S1), the % by weight being based on the total weight of the C.I. Pigment Violet 23 aqueous dispersion. CIE Whiteness and brightness are measured on a calibrated Minolta spectrophotometer. The results are shown in Table 1 and Table 2 respectively and clearly show that the use of a shading pigment representing the state-of-the-art provides significantly lower whiteness levels.

TABLE 1

| | Whiteness | | |
|---|---|---|---|
| Dye or pigment conc. (based on dry solid) [%] | Application Example 1 | Comparative Application Example 1a | Comparative Application Example 1b |
| 0 | 92.8 | 92.8 | 92.8 |
| 0.0005 | 94.1 | 94.1 | 93.4 |
| 0.001 | 95.7 | 94.9 | 94.4 |
| 0.0015 | 97.2 | 95.9 | 95.5 |
| 0.002 | 98.5 | 96.3 | 96.1 |

TABLE 2

| | Brightness | | |
|---|---|---|---|
| Dye or pigment conc. (based on dry solid) [%] | Application Example 1 | Comparative Application Example 1a | Comparative Application Example 1b |
| 0 | 91.8 | 91.8 | 91.8 |
| 0.0005 | 91.7 | 91.6 | 91.5 |
| 0.001 | 91.8 | 91.4 | 91.8 |
| 0.0015 | 91.8 | 91.1 | 91.7 |
| 0.002 | 91.6 | 90.5 | 91.7 |

Application Example 2

A coating composition is prepared containing 70 parts chalk (commercially available under the trade name Hydrocarb 90 from OMYA), 30 parts clay (commercially available under the trade name Kaolin SPS from IMERYS), 42.8 parts water, 0.6 parts dispersing agent (a sodium salt of a polyacrylic acid commercially available under the trade name Polysalz S from BASF), 20 parts of 50% latex (a styrene butadiene copolymer commercially available under the trade name DL 921 from Dow), 0.8 parts of a polyvinyl alcohol having a degree of hydrolysis of 98-99% and a Brookfield viscosity of 4.0-5.0 mPa·s (4% aqueous solution at 20° C.) and 0.5 parts of an aqueous solution of compound of formula (3) (approx. 25.2% by weight of compound of formula (3), the % by weight being based on the total weight of the aqueous solution containing compound of formula (3)). The solids content of the coating composition is adjusted to approx. 65% by the addition of water, and the pH is adjusted to 8-9 with sodium hydroxide.

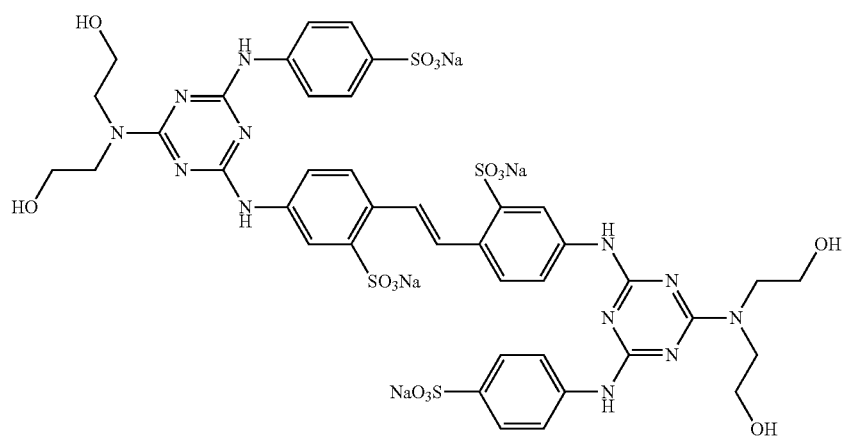

(3)

Aqueous shading solution (S1) prepared according to preparative example 1 is diluted 1 part to 1000 parts with water.

The so-formed diluted aqueous solution is added to the stirred coating preparation at a range of concentrations of from 0 to 20% by weight (from 0 to 0.002% by weight of compound of formula (1) based on dry solid), the % by weight being based on the total weight of the dry pigment.

The brightened and shaded coating composition is then applied to a commercial 75 gsm neutral-sized white paper base sheet using an automatic wire-wound bar applicator with a standard speed setting and a standard load on the bar. The coated paper is then dried for 5 minutes in a hot air flow. Afterwards the paper is allowed to condition and measured then for CIE Whiteness and brightness on a calibrated Minolta spectrophotometer. The results are shown in Table 3 and Table 4 respectively and clearly show that the instant invention provides a high level of whiteness, while the loss of brightness at the highest addition level of shading dye is only 0.3%.

Comparative Application Example 2a

Comparative application example 2a was conducted as in application example 2 with the sole difference that a 10% by weight aqueous solution of C.I. Direct Violet 35 is used instead of the aqueous shading solution (S1), the % by weight being based on the total weight of the C.I. Direct Violet 35 aqueous solution.

CIE Whiteness and brightness are measured on a calibrated Minolta spectrophotometer. The results are shown in Table 3 and Table 4 respectively and clearly show that use of a shad-ing dye representing the state-of-the-art provides a lower whiteness level while accounting for a significant loss of brightness of up to 2.2%.

Comparative Application Example 2b

Comparative application example 2b was conducted as in application example 2 with the sole difference that a 10% by weight aqueous dispersion of C.I. Pigment Violet 23 is used instead of the aqueous shading solution (S1), the % by weight being based on the total weight of the C.I. Pigment Violet 23 aqueous dispersion. CIE Whiteness and brightness are measured on a calibrated Minolta spectrophotometer. The results are shown in Table 3 and Table 4 respectively and clearly show that the use of a shading pigment representing the state-of-the-art provides significantly lower whiteness levels.

TABLE 3

| | Whiteness | | |
|---|---|---|---|
| Dye or pigment conc. (based on dry solid) [%] | Application Example 1 | Comparative Application Example 1a | Comparative Application Example 1b |
| 0 | 98.0 | 98.0 | 98.0 |
| 0.0005 | 99.6 | 97.9 | 98.9 |
| 0.001 | 100.6 | 98.0 | 99.8 |
| 0.0015 | 102.1 | 98.1 | 100.1 |
| 0.002 | 103.3 | 98.4 | 100.7 |

TABLE 4

| | Brightness | | |
|---|---|---|---|
| Dye or pigment conc. (based on dry solid) [%] | Application Example 1 | Comparative Application Example 1a | Comparative Application Example 1b |
| 0 | 93.5 | 93.5 | 93.5 |
| 0.0005 | 93.5 | 93.2 | 93.5 |
| 0.001 | 93.4 | 92.4 | 93.4 |
| 0.0015 | 93.3 | 91.9 | 93.3 |
| 0.002 | 93.2 | 91.4 | 93.2 |

The invention claimed is:
1. An aqueous coating composition for optical brightening and shading of a substrate comprising:

(a) at least one optical brightener of formula (I)

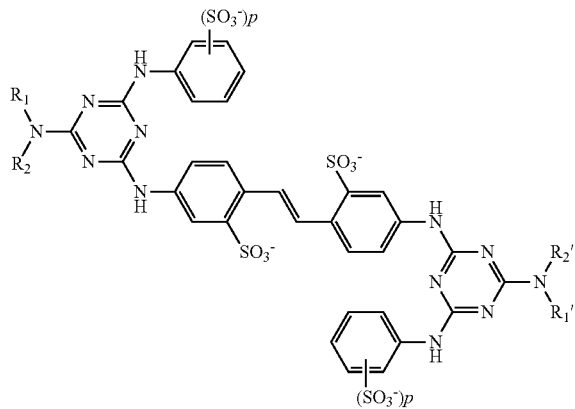

wherein the anionic charge on the at least one optical brightener is balanced by a cationic charge composed of one or more identical or different cations selected from the group consisting of hydrogen, an alkali metal cation, alkaline earth metal, ammonium, ammonium which is mono-, di-, tri- or tetrasubstituted by a $C_1$-$C_4$ linear or branched alkyl radical, ammonium which is mono-, di-, tri- or tetrasubstituted by a $C_1$-$C_4$ linear or branched hydroxyalkyl radical, ammonium which is di-, tri- or tetrasubstituted by a mixture of $C_1$-$C_4$ linear or branched alkylradical and linear or branched hydroxyalkyl radical and mixtures thereof, $R_1$ and $R_1'$ are the same or different, and are hydrogen, $C_1$-$C_4$ linear or branched alkyl, $C_2$-$C_4$ linear or branched hydroxyalkyl, $CH_2CO_2^-$, $CH_2CH_2CONH_2$ or $CH_2CH_2CN$, $R_2$ and $R_2'$ are the same or different, and are $C_1$-$C_4$ linear or branched alkyl, $C_2$-$C_4$ linear or branched hydroxyalkyl, $CH_2CO_2^-$, $CH(CO_2^-)CH_2CO_2^-$, $CH(CO_2)CH_2CH_2CO_2^-$, $CH_2CH_2SO_3^-$, $CH_2CH_2CO_2^-$, $CH_2CH(CH_3)CO_2^-$, benzyl, or $R_1$ and $R_2$ or $R_1'$ and $R_2'$ or both, together with the neighboring nitrogen atom is a morpholine ring, p is 0, 1, or 2, (b) at least one shading dye of formula (II)

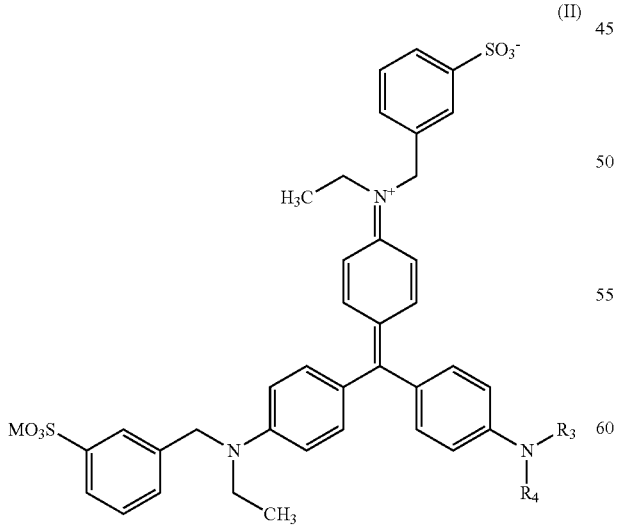

wherein
$R_3$ is H, methyl, or ethyl,
$R_4$ is paramethoxyphenyl, methyl or ethyl, M is a cation selected from the group consisting of hydrogen, an alkali metal cation, alkaline earth metal, ammonium, ammonium which is mono-, di-, tri- or tetrasubstituted by a $C_1$-$C_4$ linear or branched alkyl radical, ammonium which is mono-, di-, tri- or tetrasubstituted by a mixture of $C_1$-$C_4$ linear or branched hydroxyalkyl radical, ammonium which is di-, tri- or tetrasubstituted by a mixture of $C_1$-$C_4$ linear or branched alkylradical and linear or branched hydroxyalkyl radical and mixtures thereof, (c) at least one white pigment,
(d) at least one primary binder,
(e) optionally one or more secondary binders, and
(d) water.

2. The aqueous coating composition according to claim 1, wherein in the at least one optical brightener of formula (I) the anionic charge on the brightener is balanced by a cationic charge composed of one or more identical or different cations selected from the group consisting of hydrogen, an alkali metal cation, alkaline earth metal, ammonium which is mono-, di, tri- or tetrasubstituted by a $C_1$-$C_4$ linear or branched hydroxyalkyl radical, ammonium which is, di-, tri- or tetrasubstituted by a mixture of $C_1$-$C_4$ linear or branched alkyl radical and linear or branched hydroxyalkyl radical and mixtures thereof, $R_1$ and $R_1'$ are the same or different, and are hydrogen, $C_1$-$C_4$ linear or branched alkyl, $C_2$-$C_4$ linear or branched hydroxyalkyl, $CH_2CO_2^-$, $CH_2CH_2CONH_2$ or $CH_2CH_2CN$, $R_2$ and $R_2'$ are the same or different, and are $C_1$-$C_4$ linear or branched alkyl, $C_2$-$C_4$ linear or branched hydroxyalkyl, $CH_2CO_2^-$, $CH(CO_2^-)CH_2CO_2^-$, or $CH_2CH_2SO_3^-$, and $R_1$ and $R_2$ or $R_1'$ and $R_2'$ or both, together with the neighboring nitrogen atom is a morpholine ring, p is 0, 1, or 2.

3. The aqueous coating composition according to claim 1, wherein the at least one optical brightener of formula (I) is used in an amount of from 0.01 to 5% by weight based on the total dry weight of the at least one white pigment.

4. The aqueous coating composition according to claim 1, wherein in the at least one shading dye of formula (II)
$R_3$ is H, methyl or ethyl,
$R_4$ is paramethoxyphenyl, methyl or ethyl,
M is a cation selected from the group consisting of hydrogen, an alkali metal cation, alkaline earth metal, ammonium which is mono-, di-, tri- or tetrasubstituted by a $C_1$-$C_4$ linear or branched hydroxyalkyl radical, ammonium which is, di-, tri- or tetrasubstituted by a mixture of $C_1$-$C_4$ linear or branched alkylradical and linear or branched hydroxyalkyl radical and mixtures thereof.

5. The aqueous coating composition according to claim 1, wherein in the at least one shading dye of formula (II)
$R_3$ is methyl or ethyl,
$R_4$ is methyl or ethyl,
M is a cation selected from the group consisting of $Li^+$, $Na^+$, $K^+$, $\frac{1}{2}Ca^{2+}$, $\frac{1}{2}Mg^{2+}$, ammonium which is mono-, di-, tri- or tetrasubstituted by a $C_1$-$C_4$ linear or branched hydroxyalkyl radical, ammonium which is, di-, tri- or tetrasubstituted by a mixture of $C_1$-$C_4$ linear or branched alkylradical and linear or branched hydroxyalkyl radical and mixtures thereof.

6. The aqueous coating composition according to claim 1, wherein the at least one shading dye of formula (II) is used in an amount from 0.00001 to 0.01% by weight based on the total dry weight of the at least one white pigment.

7. The aqueous coating composition according to claim 1, wherein the coating composition comprises 10 to 70% by weight of the at least one white pigment, based on the total weight of the coating composition.

8. The aqueous coating composition according to claim 1, wherein the at least one primary binder is a synthetic latex, vinyl acetate, styrene acrylic, vinyl acrylic or ethylene vinyl acetate polymer.

9. The aqueous coating composition according to claim 1, wherein the at least one primary binder is used in an amount in the range from 2 to 25% by weight based on the total weight of the at least one white pigment.

10. The aqueous coating composition according to claim 1, wherein one or more secondary binders is present and is starch, carboxymethylcellulose, casein, soy polymers, polyvinyl alcohol or a mixture thereof.

11. The aqueous coating composition according to claim 10, wherein the one or more secondary binders is polyvinyl alcohol.

12. The aqueous coating composition according to claim 11, wherein the polyvinyl alcohol has a degree of hydrolysis greater than or equal to 60% and a Brookfield viscosity of from 2 to 80 mPa·s (4% aqueous solution at 20° C.).

13. The aqueous coating composition according to claim 1, wherein the one or more secondary binders is used in an amount in the range from 0.1 to 20% by weight based on the total weight of the at least one white pigment.

14. The aqueous coating composition according to claim 1, wherein the pH value of the coating composition is in the range of from 4 to 12.

15. A shaded or whitened paper substrate produced using an aqueous coating composition according to claim 1.

16. The shaded or whitened paper substrate according to claim 15, wherein the coating composition is used as a preformed solution comprising the at least one optical brightener of formula (I) in a concentration of 1 to 50 weight % and the at least one shading dye of formula (II) in a concentration of 0.001 to 30 weight % based on the total weight of the preformed aqueous solution.

17. The aqueous coating composition according to claim 1, wherein in the at least one optical brightener of formula (I) p is 1, and the $SO_3^-$ group is in the 4-position of the phenyl group.

18. The aqueous coating composition according to claim 1, wherein wherein in the at least one optical brightener of formula (I) p is 2, and the $SO_3^-$ groups are in the 2,5-positions of the phenyl group.

19. The aqueous coating composition according to claim 1, wherein the at least one primary binder is a styrene-butadiene polymer.

* * * * *